United States Patent [19]
Dudley

[11] 3,850,814
[45] Nov. 26, 1974

[54] SCRAPER CONVEYOR FOR A CENTRIFUGAL SEPARATOR
[75] Inventor: Robert H. Dudley, Portage, Mich.
[73] Assignee: Prab Conveyors, Inc., Kalamazoo, Mich.
[22] Filed: Feb. 20, 1974
[21] Appl. No.: 444,054

Related U.S. Application Data
[63] Continuation of Ser. No. 268,706, July 3, 1972, abandoned.

[52] U.S. Cl.............. 210/298, 210/304, 210/512, 209/13, 209/240
[51] Int. Cl. ..................................... B01d 21/26
[58] Field of Search ............ 210/73, 298, 304, 512; 209/254, 306, 13, 17, 18, 240, 241, 243

[56] References Cited
UNITED STATES PATENTS
2,499,457  3/1950  Buquoi et al. .................. 210/374
3,679,051  7/1972  Larson et al. ................... 210/73
3,767,047  10/1973  Rasmussen .................... 209/240

Primary Examiner—Samih N. Zaharna
Assistant Examiner—F. F. Calvetti
Attorney, Agent, or Firm—Gordon W. Hueschen

[57] ABSTRACT

An endless chain is equipped with a plurality of spaced flights and is situated in an annular liquid-receiving trough of a centrifugal separator. A motor-driven sprocket means drivably engages the chain, and as the chain travels around the trough finely divided solids which settle in the trough are removed therefrom.

6 Claims, 3 Drawing Figures 3,850,814

SCRAPER CONVEYOR FOR A CENTRIFUGAL SEPARATOR

This is a continuation of application Ser. No. 268,706, filed July 3, 1972, now abandoned.

BACKGROUND OF THE INVENTION

This invention relates to the processing of metal or plastic chips that are generally produced during manufacturing processes on machines such as lathes, milling machines, drills, gear hobbers, boring mills, grinding wheels, and the like.

In most instances during the foregoing machining operations cutting and/or cooling liquids are utilized. Both the generated chips and the cutting and/or cooling liquids possess substantial reclamation value and are usually recovered by centrifugal separation of the liquid from the solid chips in the liquid-chip admixture. However, during handling and centrifugation some of the chips become comminuted and in some instances a portion of the chips generated during machining is already very finely divided. Substantial amounts of such comminuted or finely divided chips remain entrained in the liquid portion which is separated during centrifugation. These entrained solid particles tend to settle out in the liquid-receiving trough of the centrifugal separator and form a sludge which has to be cleaned out periodically.

It is an object of the present invention to provide a convenient means for the removal of finely divided chip particles which settle out in the liquid-receiving trough of a centrifugal separator without necessitating shutdown of the separator.

It is a further object of this invention to provide a means for reclaiming finely divided chip particles which are entrained in the liquid portion of a liquid-chip admixture during centrifugation.

Still other objects will become readily apparent to one skilled in the art upon reference to the ensuing specification, the drawings, and the claims.

SUMMARY OF THE INVENTION

The present invention contemplates a scraper conveyor for a centrifugal separator removing liquid from comminuted solid materials and provided with an annular liquid-receiving trough for receiving the removed liquid. The scraper conveyor comprises an endless chain which is situated in the liquid trough, sprocket means drivably engaging the chain, motor means driving the sprocket means, and a plurality of spaced flights attached to the chain and in substantial contact with the bottom portion of the liquid trough. The flights gather up the solid particles that settle in the trough and transport these particles out of the trough through a chute or duct means provided in the side of said trough.

DESCRIPTION OF THE PREFERRED EMBODIMENTS

Figure 1:
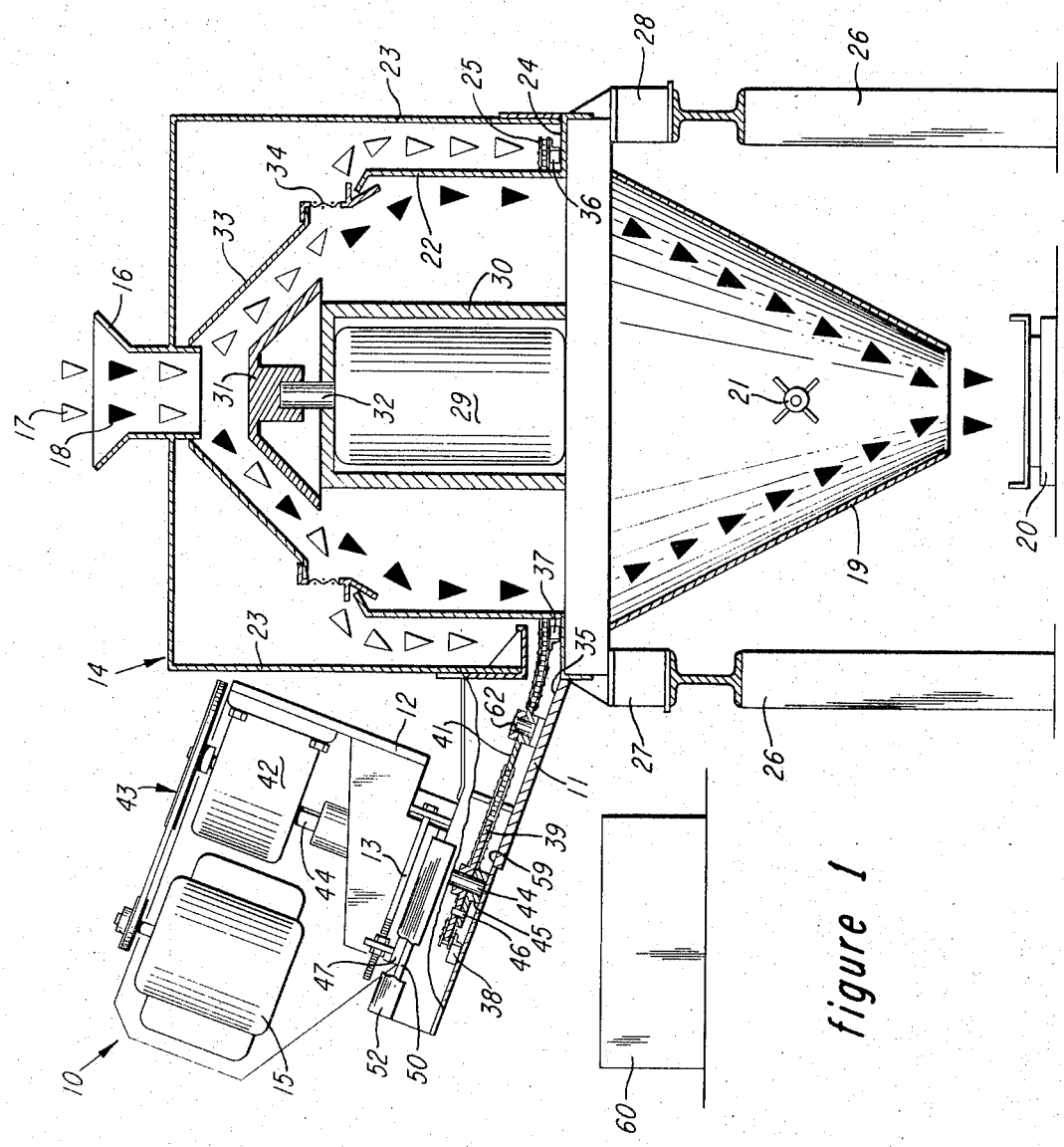
FIG. 1 is a side elevational view of a scraper conveyor of this invention attached to a centrifugal separator, partially broken away to show interior detail.

Referring to FIG. 1, scraper conveyor 10 is driven by conveyor motor 15 and comprises duct means 11 and frame means 12 slidably mounted on duct means 11 and held in a predetermined position with adjacent screws such as jack screw 13.

Duct 11 is attached to centrifugal separator 14 which is mounted on a suitable frame 26 by means of vibration dampening suspensions 27 and 28. Separator 14 comprises centrally situated motor 29 disposed in motor housing 30. Rotary distributing cone 31 is mounted above motor 29 and is driven by motor shaft 32. Separating bowl 33, provided with peripheral screen 34, envelops motor 29 and cone 31.

The separator charge contains both liquid particles 17 and solid particles 18 which are received into separator 14 via charging hopper 16. During operation, the solid-liquid admixture comprising the charge passing through charging hopper 16 is received on cone 31 and a high linear velocity is imparted to both solid particles 18 and liquid particles 17. As the incoming charge pushes the rotating particles further down the surface of cone 31, liquid particles 17 separate and pass through screen 34. Some finely divided solid particles are carried along with the liquid particles as well. Solid particles 18, on the other hand, drop into product hopper 19 and are deposited on suitable discharge conveyor 20 and transported away to storage. Solids level sensor 21 is usually provided in product hopper 19 to signal an undesired solids buildup therein. Sensor 21 can be conveniently of the rotating vane type as shown; however, any suitable solids level indicator can be employed. Separator housing 23, together with inner wall 22, define annular liquid receiving trough 24 in which separator liquid particles 17 collect together with the finely divided solid particles entrained therein.

Endless chain 25 is situated in liquid receiving trough 24 and extends also into duct 11 which is attached to separator housing 23 and communicates with trough 24. When it is desired to recover the finely divided chip particles from the liquid and/or when a substantial amount of liquid is present in the trough, duct 11 preferably extends upwardly past opening 35 in separator housing 23 so that the liquid collected in trough 24 does not spill out but is retained therein until withdrawal into an appropriate storage container. When, on the other hand, the relative amount of liquid in trough 24 is small and the prime objective is to remove accumulated sludge from trough 24, duct 11 can extend laterally or even downwardly if desired. Flights 36, 37 and 38 are elongated, inverted L-shaped members attached to chain 25 and are illustrative of a plurality of flights which are attached to chain 25 in a spaced relationship to each other and which traverse the bottom portion of trough 24 when the scraper conveyor of this invention is in operation.

Sprocket means for driving endless chain 25 are situated in duct 11 and comprise drive sprocket 39 and a pair of opposed idler sprockets such as idler sprocket 40 and idler sprocket 41 (FIG. 3) suitably journalled on shafts 61 and 62 in duct 11. Conveyor motor 15 drives speed reducer 42 by means of V-belt and sheave arrangement 43, drive sprocket 39 is journalled on speed reducer output shaft 44, shear hub 45 is affixed to output shaft 44, and drive sprocket 39 is fixedly attached to shear hub 45 by means of shear pin 46.

Figure 3:
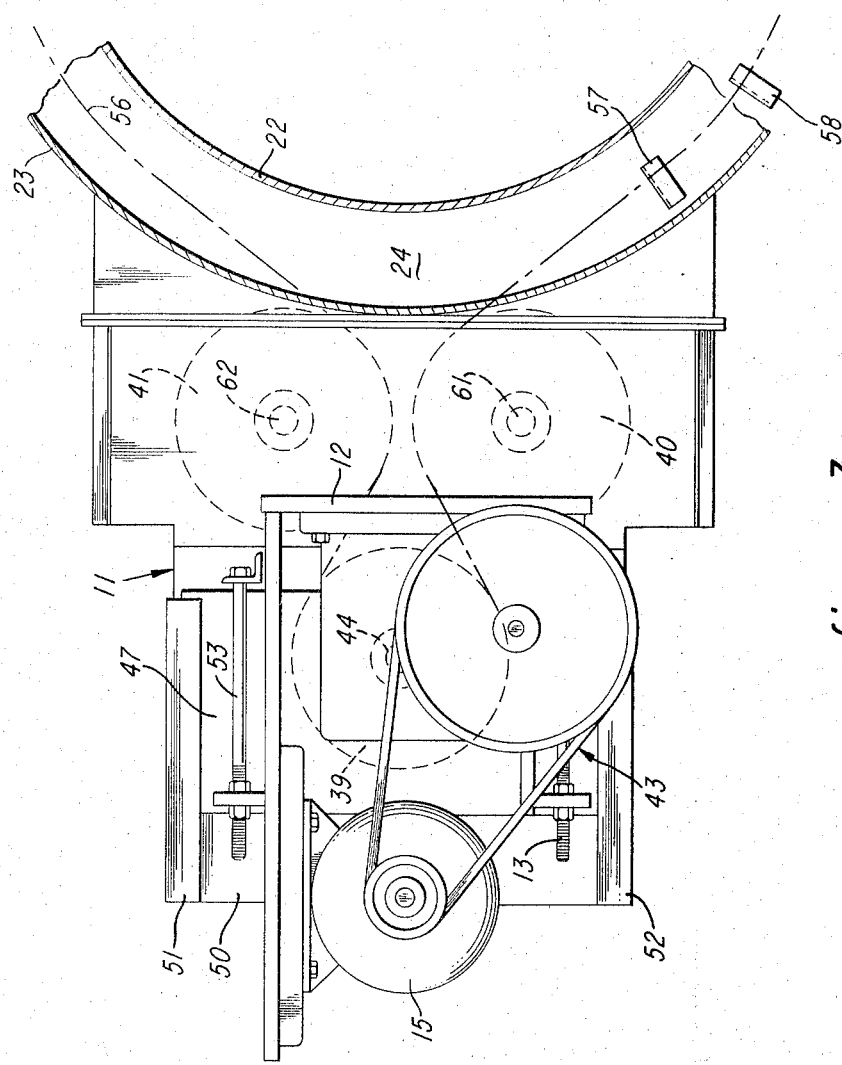
FIG. 3 is a fragmentary top view of the scraper conveyor and centrifugal separator of FIG. 1, partially broken away and showing the relative positions of the liquid trough, path of the endless chain, and the drive means therefor.
Figure 2:
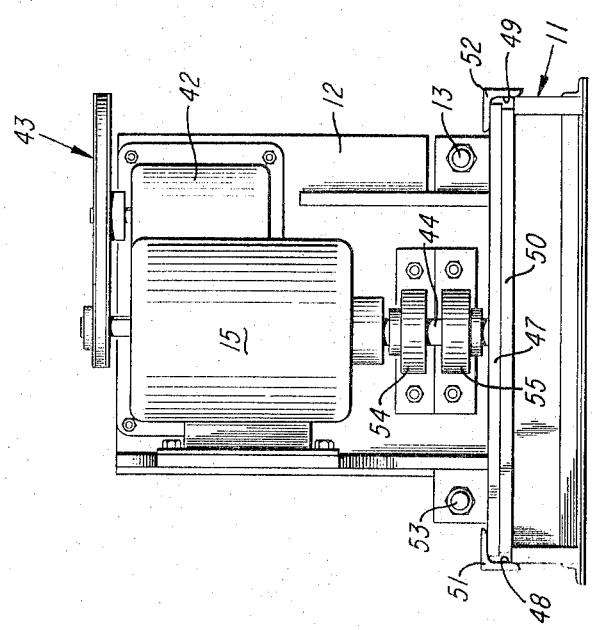
FIG. 2 is an end elevational view of the scraper conveyor.

Referring to FIGS. 2 and 3, frame 12, including platform 47 which is an integral part thereof, preferably is slidably mounted on duct 11 and is adapted for back and forth movement in guideways 48 and 49 defined by plate 50 and angle irons 51 and 52, respectively. By means of this arrangement, endless chain 25 can be adjusted to the desired tension by an appropriate back and forth movement of frame 12 and fixed in a desired position with jack screws 13 and 53. Chain 25 can also be adjusted to the desired tension by adjusting the relative positions of idler sprockets 40 and 41. To minimize flexing, speed reducer output shaft 44 is journalled in bearings 54 and 55 mounted on frame 12.

Interrupted line 56 in FIG. 3 shows the pitch line of endless chain 25 and flights 57 and 58 illustrate a suitable relative spacing between adjacent flights.

In operation, as drive sprocket 39 engaging endless chain 25 is turned, flights 36, 37, 38, 57 and 58 travel across the bottom portion of trough 24 and carry with them accumulated solid sediment or sludge. The sediment or sludge is carried into duct 11 and over ledge 59 so that the sediment or sludge drops into appropriate container 60 or suitable conveyor means and can be transported away.

The foregoing discussion and the drawings are intended as illustrative and are not to be construed as limiting. Still other variations and rearrangements of parts within the spirit and scope of this invention are possible and will readily present themselves to the skilled artisan.

I claim:

1. An apparatus for the centrifugal separation of larger solid particles from liquids and for removing finely divided solid materials entrained in the liquid after the first separation of the larger particles from the liquid which comprises in combination, a centrifugal separator for separating large particles from liquid and finely divided particles comprising a centrally positioned motor, a rotary distributing cone mounted above and driven by said motor, a separating bowl provided with a peripheral screen enveloping the motor and cone, and a liquid-receiving trough;

a scraper conveyor in the liquid-receiving trough of the centrifugal separator;

duct means mounted on the outside of said liquid-receiving trough and communicating with said trough for transporting remaining finely divided solid particles out of the liquid-receiving trough;

endless chain situated in said liquid receiving trough and said duct means;

a plurality of spaced flights attached to said chain for traversing the bottom portion of said liquid-receiving trough;

frame means mounted on said duct means;

sprocket means situated in said duct means and drivably engaging said chain; and motor means mounted on said frame means and drivably connected to said sprocket means.

2. The scraper conveyor in accordance with claim 1 wherein the sprocket means comprises a drive sprocket driven by said motor means through a speed reducer means and a pair of opposed idler sprockets mounted in said duct means and operably engaging said chain.

3. The scraper conveyor in accordance with claim 1 wherein a shear hub is fixedly mounted on the output shaft of said speed reducer, and the drive sprocket is journalled on said output shaft and fixedly attached to said shear hub by means of a shear pin.

4. The scraper conveyor in accordance with claim 1 wherein each flight is an elongated, inverted L-shaped member.

5. The scraper conveyor in accordance with claim 1 wherein the duct means mounted on the outside of said trough is extending upwardly.

6. The scraper conveyor in accordance with claim 1 wherein the frame means is slidably mounted on said duct means.

* * * * *

UNITED STATES PATENT OFFICE
CERTIFICATE OF CORRECTION

Patent No. 3,850,814     Dated November 26, 1974

Inventor(s) ROBERT H. DUDLEY

It is certified that error appears in the above-identified patent and that said Letters Patent are hereby corrected as shown below:

Patent Reads:

Col. 2, line 9:
"adjacent"

Col. 2, line 39:
"separator"

Claim 3:
"in accordance with claim 1"

Application Reads:

Page 3, line 5:
---adjustment---

Page 3, line 30:
---separated---

Claim 3:
---in accordance with claim 2---

Signed and sealed this 11th day of February 1975.

(SEAL)
Attest:

RUTH C. MASON
Attesting Officer

C. MARSHALL DANN
Commissioner of Patents
and Trademarks